United States Patent [19]
Wachholz et al.

[11] Patent Number: 4,689,194
[45] Date of Patent: Aug. 25, 1987

[54] NUCLEAR REACTOR PLANT WITH A SMALL HIGH TEMPERATURE REACTOR OPERATING WITH SPHERICAL FUEL ELEMENTS

[75] Inventors: Winfried Wachholz, Gorxheimertal; Ulrich Weicht, Weinheim, both of Fed. Rep. of Germany

[73] Assignee: Hochtemperatur-Reaktorbau GmbH, Fed. Rep. of Germany

[21] Appl. No.: 780,260

[22] Filed: Sep. 26, 1985

[30] Foreign Application Priority Data

Sep. 26, 1984 [DE] Fed. Rep. of Germany ....... 3435255

[51] Int. Cl.⁴ .............................................. G21C 15/18
[52] U.S. Cl. .................................. 376/299; 376/298; 376/381; 376/391; 376/406
[58] Field of Search .............. 376/298, 299, 381, 383, 376/402, 406, 391

[56] References Cited

U.S. PATENT DOCUMENTS

| | | | |
|---|---|---|---|
| 2,946,732 | 7/1960 | Wootton | 376/391 |
| 2,952,602 | 9/1960 | Wootton | 376/391 |
| 3,190,808 | 6/1965 | Dodd | 376/298 |
| 3,442,759 | 5/1969 | Molle et al. | 376/406 |
| 4,404,165 | 9/1983 | Hesky et al. | 376/298 |
| 4,554,129 | 11/1985 | Peinado et al. | 376/298 |
| 4,587,079 | 5/1986 | Fajeau et al. | 376/298 |

FOREIGN PATENT DOCUMENTS 451204 5/1968 Switzerland ........................ 376/406

*Primary Examiner*—Deborah L. Kyle
*Assistant Examiner*—Richard W. Wendtland
*Attorney, Agent, or Firm*—Robert J. Koch

[57] ABSTRACT

A nuclear reactor plant with a small high temperature reactor, principal heat exchangers located above the small high temperature reactor and housed in a steel pressure vessel, and a plurality of decay heat exchangers also located in the steel pressure vessel and connected on the cooling water side with an external re-cooling heat exchanger each, in a geodetically higher location. The object of the invention is to obtain a high degree of availability of the decay heat removal installations. This object is attained by the specific layout and connection of the components of the plant, which permits the operation of the decay heat exchangers both on the primary gas and the water side by natural convection only. The decay heat exchangers and their secondary circulation loops are active during power operations, so that potential failures and leaks are detected immediately. No special actuating measures are necessary to activate the decay heat removal operation. In power operations the decay heat exchangers are cooled with a slight flow of water only, so that the output loss remains low.

14 Claims, 2 Drawing Figures

4,689,194

NUCLEAR REACTOR PLANT WITH A SMALL HIGH TEMPERATURE REACTOR OPERATING WITH SPHERICAL FUEL ELEMENTS

BACKGROUND OF THE INVENTION

1. Field of the Invention

The invention relates to a nuclear reactor installation with a small high temperature reactor. The core of the reactor comprises a pile of spherical fuel elements, with a cooling gas flowing through said core from bottom to top. The principal heat exchangers are arranged in the cooling gas circulation loop above the small high temperature reactor and housed together with the small high temperature reactor in a steel pressure vessel. At least two circulating blowers following the principal heat exchangers in the direction of flow of the cooling gas. The reactor has decay heat exchangers installed in the steel pressure vessel, each of said decay heat exchangers installed in the steel pressure vessel, each of said decay heat exchangers being connected to an external heat exchanger by a decay heat removal (NWA) water circulation loop in a geodetically higher location.

Small high temperature reactors, which are installed together with a heat utilization system (steam generator, tubular canned furnace, He/He heat exchanger) in a steel pressure vessel, different installations and processes have already been developed for the removal of decay heat.

2. Description of the Prior Art

West German Application No. P 33 45 113.3 describes a nuclear power station with a small high temperature reactor, in which the decay heat is removed by means of the operational steam generators from the primary loop. This process has the disadvantage that either the primary steam generators and blowers must have a very high availability or that in case of a failure of the primary steam generators and blowers, the installations in the reactor core are exposed to very high temperatures.

West German Application No. P 32 12 266 and West German Patent No. 31 41 892 shows to use an operational concrete cooling system for the removal of decay heat in case of a failure of the operating steam generators and/or blowers, said concrete cooling system being arranged inside a concrete safety jacket surrounding the steel pressure vessel and operated by natural circulation. The heat is transferred by radiation from the steel pressure vessel that is laid out largely without thermal insulation, to the concrete. In these two nuclear reactor plants a high degree of availability of the primary steam generators and blowers is required and high temperatures are generated on the reactor installations if these components fail.

In the nuclear reactor plant shown in West German Patent No. 32 28 422 with at least one small high temperature reactor, separate decay heat exchangers are placed in the primary loop. They are arranged together in the steel pressure vessel above the small high temperature reactor and connected in parallel with the principal heat exchangers. For each decay heat exchanger an auxiliary blower is provided in a location above it. On the cooling water side, each of the decay heat exchangers is connected through a NWA (decay heat removal) loop with a geodetically higher located recooling heat exchanger, which is installed outside a biological shield surrounding the steel pressure vessel. Each of the external recooling heat exchangers may be located in a shaft provided in the wall of the reactor protection building, the lower part filled with water is in the form of an evaporation chamber. The decay heat exchangers and the recooling heat exchangers associated with them are combined in a thermosiphon circulation. The removal of the decay heat is effected either by the evaporation of the water present in the evaporation chambers or by the transfer of heat to the external atmosphere flowing through the recooling heat exchangers and the shafts.

SUMMARY OF THE INVENTION

It is an object of the invention to develop a nuclear reactor plant in a manner such that the installation for the removal of decay heat attain a high degree of availability both in active and passive operation, without causing appreciable thermal losses.

The attainment of the above-defined object is characterized by the following elements;

(a) the decay heat exchangers are placed in the direction of flow immediately after the principal heat exchangers and are constantly traversed by the entire flow of cooling gas, (b) the circulating blowers are connected in parallel in relation to each other, (c) in each of the NWA, water circulation loops a water-steam separation is provided in the leg leading away from the decay heat-exchangers, (d) each of the recooling heat exchangers is connected by means of a recooling circulation loop with a further heat sink, preferably a cooling tower.

In power operation, the decay heat exchangers are cooled with a slight flow of water only. Although natural convection is taking place through the NWA water circulation loops, it is extensively restricted by the water-steam separating vessels. Heat losses are therefore insignificant; i.e., only a slight capacity is removed from the primary loop. Any installation to restrict the flow (fitting), which would have to be opened specifically for the decay heat removal operation, may thus be eliminated. In normal operation, the decay heat exchangers are exposed to cold gas.

A rise in temperature caused by a failure of the principal heat exchangers results in evaporation taking place at the inlet on the gas side of the decay heat exchangers in the NWA water circulation loops, whereby natural convection in the NWA water circulation loops is enhanced and a sufficient amount of heat is removed from the primary loop through the decay heat exchangers. During the decay heat removal operation, the temperatures in the primary loop remain close to operating temperatures so that the release of activities cannot increase.

Hot gas temperatures are already being reduced by the preceding principal heat exchangers, so that temperature flash-overs due to accidents cannot strike through to the decay heat exchangers. The primary loop is operated by means of the circulating blowers connected in parallel. The water-stream separator vessels provide volume equalization in the NWA water circulation loops in case of evaporation. A particular advantage of the nuclear reactor plant according to the invention is that the decay heat is removed as the result of the rising temperatures alone, i.e., no additional actuating measures are required. The circulating blowers, at least two of which are present, safely circulate the cooling gas in a redundant manner, as they are connected in parallel. The safe removal of the decay heat is assured even in the case of a pressure release accident with a very low probability of occurrence.

The specific layout and interconnection of the components in the primary loop and those in the NWA water circulation loops of the decay heat exchangers make possible the removal of heat decay by natural convection alone. In the process, a cooling gas flow of approximately 2 to 4% of the normal volume in the normal flow direction is established. Here again, no active measures, for example the opening of bypass or blower shut-off valves, are required. As both the primary loop and the NWA water circulation loops are capable of operating by natural convection, a very high degree of reliability is obtained in the removal of decay heat.

Heat is removed from the recooling heat exchangers by recooling loops, which preferably are connected with a cooling tower. The latter finally transfer the heat to the environment.

The installations according to the invention for the removal of decay heat obtain an additional degree of availability by that the decay heat exchangers and the NWA water circulation loops and the secondary sides of the decay heat exchangers operate by natural convection in a stand-by mode and are self-monitoring in their availability. Potential interferences and leakages may thus be detected immediately.

Advantageous further developments of the invention will become apparent from the dependent claims and the description below of an example of embodiment with reference to the schematic drawings.

DETAILED DESCRIPTION OF THE PREFERRED EMBODIMENT

Figure 1:
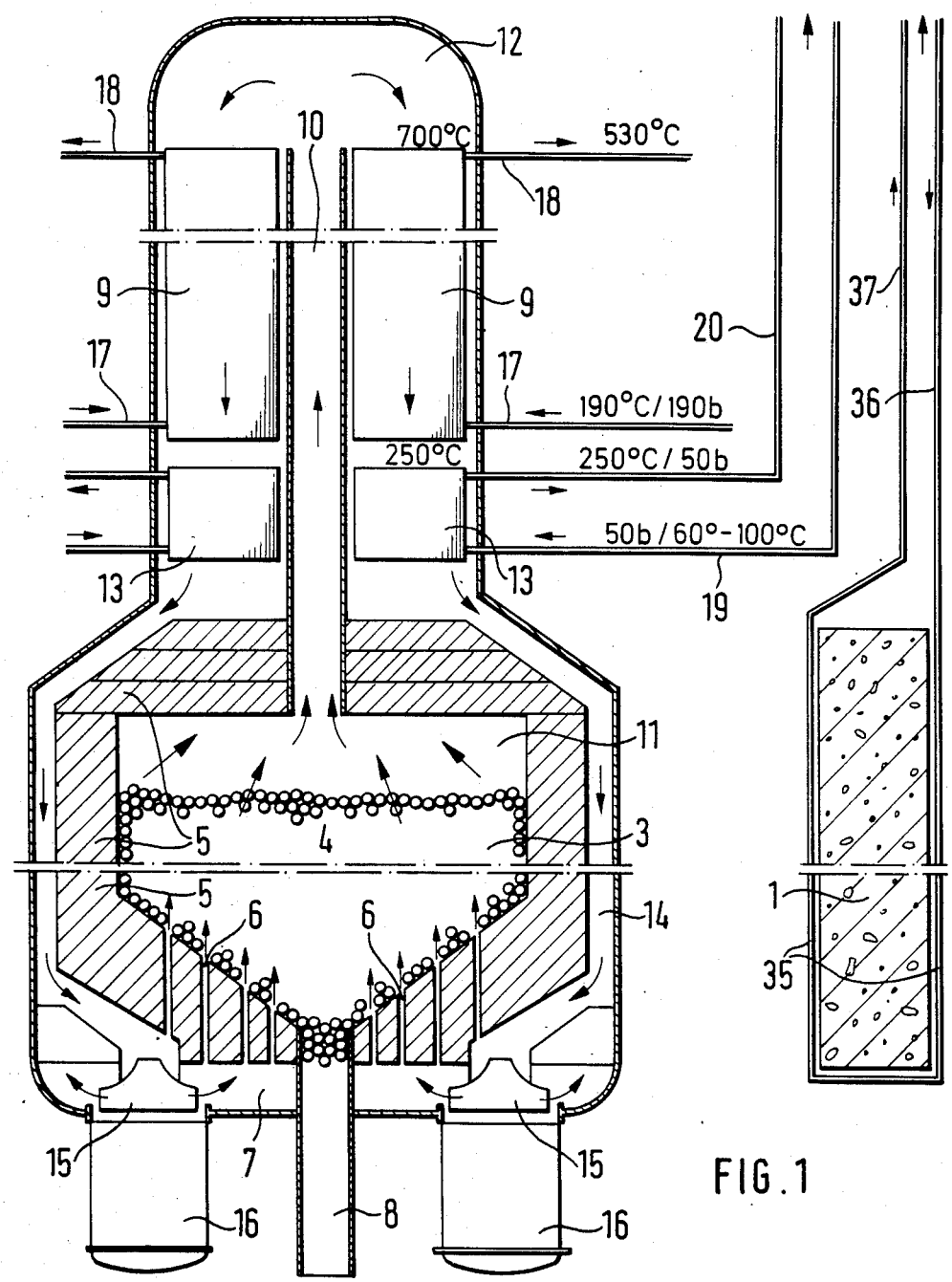
FIG. 1 shows a longitudinal section through a nuclear reactor plant according to the invention without recooling heat exchangers.

The nuclear reactor plant shown may be housed in a subterranean cavity or may be provided with a biological shield. In the present example it is equipped with a biological shield 1 (shown in part only) surrounding the radioactive part of the nuclear reactor installation. The plant itself is installed in a steel pressure 2, the upper part of which is retracted.

In the lower part of the steel pressure vessel 2, a small high temperature reactor 3 is located, the core 4, consisting of spherical fuel elements, of which is enclosed on all sides by a graphite detector 5. The bottom part of the graphite reflector 5 comprises a plurality of cooling gas conduits 6 and under it a cold gas collector chamber 7 is provided. A pebble extraction tube 8 passes through the center of the bottom part of the reflector. The feeder elements for the spherical fuel elements are now shown.

In the retracted part of the steel pressure vessel 2, several principal heat exchangers 9 are located. They are grouped around a central hot gas conduit 10. The hot gas conduit 10 passes through the roof part of the reflector and connects the space 11 above the core 4 with a space 12 above the principal heat exchangers 9. A plurality of decay heat exchangers 13 are arranged. The number of decay heat exchangers 13 equals the number of principal heat exchangers 9.

An annular gap 14 is provided between the steel pressure vessel 2 and the graphic reflector 5 leading to the inlet of several (at least two) circulating blowers 15, which in the embodiment shown are arranged under the small high temperature reactor 3.

The circulating blowers may also be installed above the small high temperature reactor 3 or over the principal heat exchangers 9. The drive motors (not shown) for the circulating blowers 15 are located in separate containers 16. The circulating blowers 15 are connected in parallel with respect to each other.

A cooling as (helium) flows through the core 4 from bottom to top. It collects in the chamber 11 and then enters the central hot gas line 10. The gas then passes through the hot gas line into the chamber 12 and is distributed over the principal heat exchangers 9 which may be for example steam generators. The cooling gas flows through the steam generators from top to bottom, whereby at the outlet of the stem generators 9 the gas temperature is cooled from approximately 700° C. to 250° C. The decay heat exchangers 13 are also traversed following the steam generators 9 in line from top to bottom by the principal cooling gas flow and are in normal operation exposed to cold gas at 250° C.

The cooling gas flows through the annular gap following its exit from the decay heat exchangers 13 in the downward direction and is conducted to the circulating blowers 15 wherein it is compressed to 70 bar. The cooling gas then enters the cold gas collector space 7 and flows from there through the cooling gas conduits 6 back into the core 4.

The steam generators 9 are operated with feed water at approximately 190° and a pressure of 190 bar and attain a live steam temperature of approximately 530° C. The feed water is supplied to the steam generators 9 by the feed water lines 17, while the live steam is removed from the steam generators 9 through live steam lines 18. The steam generators 9 may be operated as vertical evaporators, which is highly advantageous for charging and discharging and for interrupted operation.

The decay heat exchangers 13 are operated on the secondary side with cooling water at 60° to 100° C. and 50 bar, with the pressure chosen such that the cooling water at the outlet of the decay heat exchangers 13 does not evaporate (the evaporation temperature at 50 bar is approximately 260° C., while the outlet temperature of the cooling water is around 250° C.). The selection of a lower pressure on the secondary side of the heat exchanger 13 than on the primary side assures that in the case of damage to the tubes cooling gas may only enter the secondary loops and the damage is readily detected. This condition permits the unambiguous detection of tube damage in the steam generators 9, as such damage would result in the emission of humidity. One central measurement of humidity would thus suffice to detect tube damage in the steam generators and to be able to shut down the damaged steam generator.

Figure 2:
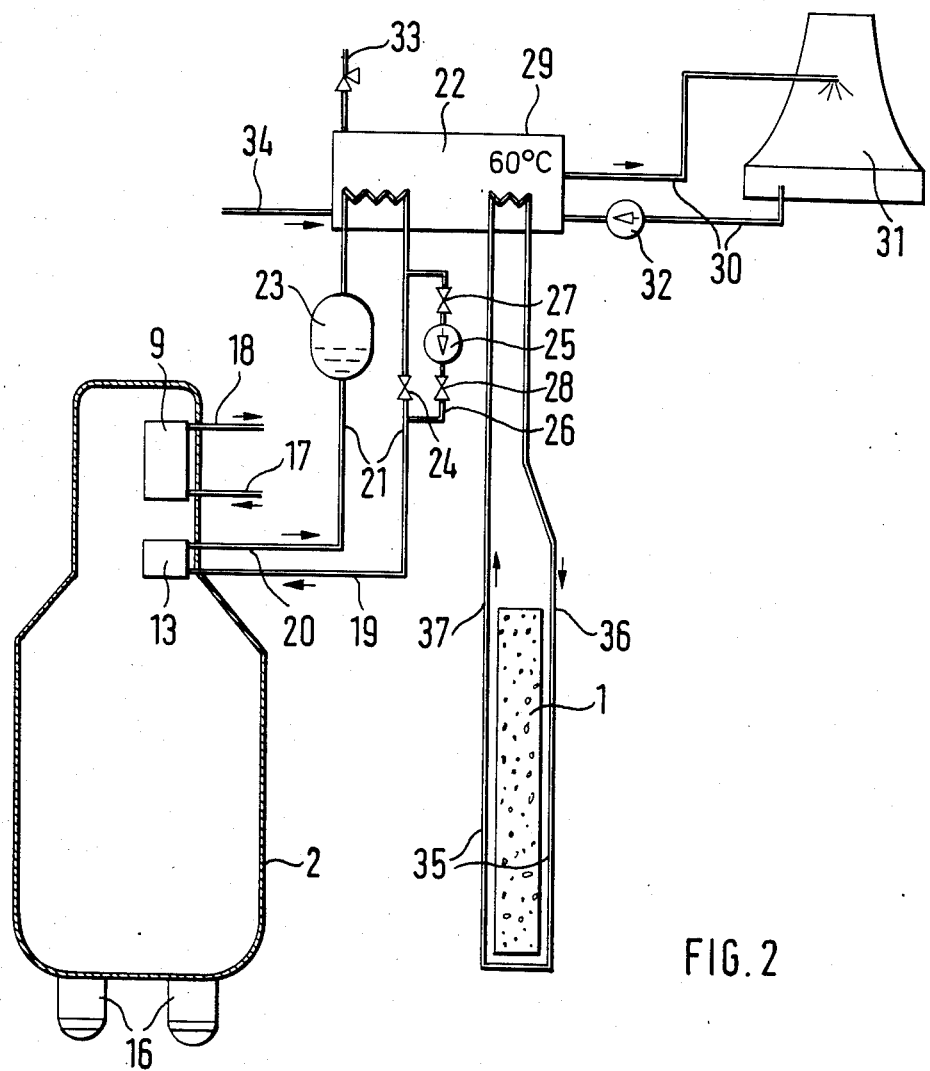
FIG. 2 shows the same installation with the complete recooling system of a decay heat exchanger.

FIG. 2 shows the secondary side loop of one of the decay heat exchangers 13. The decay heat exchanger 13 is connected with an external recooling heat exchanger 22 at a geodetically higher location by means of two legs 19 and 20 which form an NWA water circulation loop 21. A water-steam separator vessel 23 is located in leg 20 leading away from the decay heat exchanger 13. A shut-off valve 24 is provided in the leg 19 leading to the decay heat exchanger 13. A circulating pump 25 is arranged in line segment 26 parallel to the leg 19 which bridges over the shut-off valve 24. Shut-off fittings 27 and 28 are placed before and after the circulating pump 25 in the line segment 26.

The recooling heat exchanger 22, which comprises a reservoir 29 filled with water, is connected to a cooling tower 31 by a recooling circulation loop 30. A circulating pump 32 is provided in the recooling circulation loop 30. The water reservoir 29 is equipped with a safety valve 33. The volume of water present in the recooling circulation loop 30 and the water reservoir 29 is dimensioned so that the decay heat may be removed safely from the primary loop for approximately 24 hours by evaporation alone. Water losses due to evaporation may be replaced even over extended periods of time by means of an installation 34 for the resupply of water provided to the water reservoir 29.

The biological shield 1 is equipped with a concrete cooling system 35 operated by natural convection. Such a concrete cooling system is known from West German Patent No. 31 41 892. The recooling of the water circulating in the concrete cooling system 35 is effected by means of the recooling heat exchanger 22. The recooling heat exchanger 22 and concrete cooling system 35 are connected by lines 36 and 37.

The NWA water circulation loop 21 is operated in normal operation by natural convection and a low volume of water, with the shut-off valve 24 in the open position.

The mode of operation of the decay heat removal installations is described below.

If the steam generators 9 are no longer available for the removal of decay heat from the primary loop, they are traversed by hot gas, which subsequently passes into the decay heat exchangers 13. The rise in temperature at the inlet of the decay heat exchangers leads to evaporation in the NWA water circulation loops 21. The natural convection in these loops is increased and the decay heat is safely removed from the primary loop. The water-steam separator vessels 23 provide volume equalization during vaporation. It is assured that over the long term the primary loop may be further cooled by forced water circulation by means of the circulating pumps 25 provided in the NWA water circulation loops. The nuclear reactor plant may be cooled down within a short period of time for potentially needed repairs by forced water circulation.

The primary loop is continued in operation by means of the redundantly present circulating blowers 15. If the circulating blowers 15 are no longer available, the decay heat is removed by natural convection only. The flow of cooling gas established in this manner amounts to approximately 2 to 4% of the normal volume in the direction of normal flow.

The recooling heat exchangers 22 are cooled by the recooling circulation loops 30 and the cooling tower 31, which finally releases the heat to the environment. In the recooling circulation loops 22, a temperature of approximately 60° C. is established. In case of a failure of this recooling system, the water present in the water reservoirs 29 is evaporated and the steam exits through the safety valves 33 into the environment. If the failure of the recooling system lasts for more than 24 hours, the decay heat may be removed even for longer periods of time by the injection of water through the installations 34.

Finally, the decay heat may also be removed by means of the concrete cooling systems 35, which absorbs the heat radiated by the steel pressure vessel and transfers it to the recooling heat exchangers 22.

The installations for the removal of decay heat in the nuclear reactor installation described above are characterized by a high degree of availability, obtained by the elimination of active components and switching functions in the decay heat exchangers 13 and their secondary circulation loops, together with the fact that these components are constantly in use even in power operation and are thus self-monitoring.

What is claimed is:

1. A nuclear reactor plant with a small high temperature reactor, the core of which has a pile of spherical fuel elements traversed from bottom to top by cooling gas in a cooling gas loop, housed in a steel pressure vessel comprising:

decay heat exchanger means for removal of decay heat from said reactor in said cooling loop housed within said pressure vessel above the small high temperature reactor;

principal heat exchanger means for removal of operational heat from said reactor, in said cooling loop, housed within said pressure vessel above said decay heat exchanger means;

at least two blower means connected in parallel for circulating cooling gas so as to cause a flow of gas from the top to the bottom of the principal heat exchanger means;

the decay heat exchanger means are arranged in the flow of cooling gas directly behind the principal heat exchanger means and are continuously traversed by the entire flow of cooling gas;

a water circulation loop means for removal of decay heat connected to said decay heat exchanger means and having a means for water-steam separation provided in a leg of the circulation loop means leading away from said decay heat exchanger means;

an external recooling heat exchanger means connected to said water circulation loop means for removal of heat therefrom, located in a geodetically higher location;

a recooling circulation loop means for connecting said recooling heat exchanger means with an additional means for sinking heat.

2. A nuclear reactor plant as in claim 1, wherein the water circulation loop means are operated at a lower pressure than a the cooling gas loop for removing operational heat from the core of the high temperature reactor and connected thereto with the pressure being set so that in normal operation no evaporation takes place in the decay heat exchangers.

3. A nuclear reactor plant as in claim 1 further comprising a central hot gas conduit, which connects a space above the small temperature reactor with a space over the principal heat exchanger means, from which hot gas enters the principal heat exchangers, and where the decay heat exchanger means are located between the space above the small high temperature reactor and the principal heat exchanger means.

4. A nuclear reactor plant as in claim 3 wherein the blower means are located under the small high temperature reactor.

5. A nuclear reactor plant as in claim 3 wherein the blower means are located between the decay heat exchanger means and the small high temperature reactor.

6. A nuclear reactor plant as in claim 3, wherein the blower means are located above the principal heat exchanger means, with the cold gas being diverted in the upward direction under the decay heat exchanger means and a coaxial gas conduit provided for the conduction of the cold gas to the circulating blowers and its removal in the downward direction.

7. A nuclear reactor as in claim 1 wherein each of the water circulation loop means further comprises a circulating pump connected in parallel to a leg leading to the decay heat exchanger means and means for shut-off is provided both before and after the circulating pump and in a portion of the leg bridged over by the parallel connection.

8. A nuclear reactor plant as in claim 1 wherein each of the external recooling heat exchanger means further comprises a reservoir filled with water and connected by the recooling circulation loop provided with a circulating pump, with a cooling tower, wherein the recooling circulation loop includes a circulating pump.

9. A nuclear reactor plant as in claim 8 wherein the water filled reservoirs further comprise a safety valve.

10. A nuclear reactor plant as in claim 8 wherein each of the water filled reservoirs further comprise means for feeding water into the reservoir.

11. A nuclear reactor plant as in claim 1 further comprising a concrete biological shield surrounding the steel pressure vessel, wherein the biological shield comprises means for cooling concrete operated by natural convection, said means for cooling being connected with the recooling heat exchanger means.

12. A nuclear reactor plant as in claim 1 wherein the blower means are located under the small high temperature reactor.

13. A nuclear reactor plant as in claim 1 wherein the blower means are located between the decay heat exchanger means and the small high temperature reactor.

14. A nuclear reactor plant as in claim 1 wherein the blower means are located above the principal heat exchanger means, with the cold gas being diverted in the upward direction under the decay heat exchangers and a coaxial gas conduit provided for the conduction of the cold gas to the circulating blowers and its removal in the downward direction.

* * * * *